(12) United States Patent
Zhang et al.

(10) Patent No.: US 10,594,422 B2
(45) Date of Patent: Mar. 17, 2020

(54) METHOD AND APPARATUS FOR TRANSMITTING CLOCK PACKET

(71) Applicant: Huawei Technologies Co., Ltd., Shenzhen, Guangdong (CN)

(72) Inventors: Yawei Zhang, Beijing (CN); Yeying Liu, Wuhan (CN); Peng Li, Beijing (CN); Haishan Bi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 27 days.

(21) Appl. No.: 16/038,508

(22) Filed: Jul. 18, 2018

(65) Prior Publication Data
US 2018/0323890 A1    Nov. 8, 2018

Related U.S. Application Data

(63) Continuation of application No. PCT/CN2016/071315, filed on Jan. 19, 2016.

(51) Int. Cl.
*H04J 3/06* (2006.01)
*H04L 12/42* (2006.01)

(52) U.S. Cl.
CPC .......... *H04J 3/0658* (2013.01); *H04J 3/0641* (2013.01); *H04J 3/0644* (2013.01); *H04J 3/0661* (2013.01);
(Continued)

(58) Field of Classification Search
None
See application file for complete search history.

(56) References Cited

U.S. PATENT DOCUMENTS

| 6,185,216 B1 | 2/2001 | Chapman |
| 6,765,863 B1 * | 7/2004 | Wakimoto ............ H04J 3/0641 370/218 |

(Continued)

FOREIGN PATENT DOCUMENTS

| CN | 101895384 A | 11/2010 |
| CN | 102208958 A | 10/2011 |

(Continued)

OTHER PUBLICATIONS

IEEE Standard for a Precision Clock Synchronization Protocol for Networked Measurement and Control Systems. Jul. 24, 2008.*
(Continued)

*Primary Examiner* — Andrew C Oh
(74) *Attorney, Agent, or Firm* — Leydig, Voit & Mayer, Ltd.

(57) ABSTRACT

Embodiments of the present disclosure disclose a method for transmitting a clock packet. The method includes: a first network element generates a first clock packet, where the first clock packet includes a first source identity and first clock information, and the first source identity is used to indicate a device that provides the first clock information. The first network element sends the first clock packet to a second network element forming a ring network with the first network element. The first network element receives a second clock packet sent by the second network element, where the second clock packet includes a second source identity and second clock information, and the second source identity is used to indicate a device that provides the second clock information. The first network element skips tracking the second clock information after determining that the second source identity is the same as the first source identity.

20 Claims, 3 Drawing Sheets

(52) U.S. Cl.
CPC .......... *H04J 3/0679* (2013.01); *H04L 12/422*
(2013.01); *H04J 3/0664* (2013.01)

(56) References Cited

U.S. PATENT DOCUMENTS

| | | | |
|---|---|---|---|
| 7,447,931 B1 | 11/2008 | Rischar et al. | |
| 7,499,423 B1* | 3/2009 | Amos | G01S 5/06 |
| | | | 324/387 |
| 8,427,963 B2* | 4/2013 | Zampetti | H04J 3/0641 |
| | | | 370/242 |
| 9,699,051 B2* | 7/2017 | Rată | H04L 43/106 |
| 9,760,114 B1* | 9/2017 | Gopalakrishnan | G06F 1/12 |
| 10,349,367 B2* | 7/2019 | Aldana | H04W 72/0446 |
| 2003/0117864 A1* | 6/2003 | Hampel | G11C 7/10 |
| | | | 365/200 |
| 2006/0245453 A1 | 11/2006 | Bedrosian | |
| 2007/0147435 A1* | 6/2007 | Hamilton | G06F 1/14 |
| | | | 370/503 |
| 2009/0271750 A1* | 10/2009 | Richardson | G06F 17/5031 |
| | | | 716/113 |
| 2011/0051752 A1* | 3/2011 | Tang | H04J 3/0641 |
| | | | 370/503 |
| 2011/0142080 A1* | 6/2011 | Diab | H04J 3/0667 |
| | | | 370/503 |
| 2011/0305307 A1* | 12/2011 | Wang | H04J 3/0667 |
| | | | 375/362 |
| 2012/0136956 A1* | 5/2012 | Khoury | H04J 3/0667 |
| | | | 709/208 |
| 2012/0207178 A1* | 8/2012 | Webb, III | H04L 47/365 |
| | | | 370/429 |
| 2012/0250704 A1* | 10/2012 | Yamada | H04J 3/0661 |
| | | | 370/503 |
| 2012/0300859 A1* | 11/2012 | Chapman | H04J 3/0667 |
| | | | 375/257 |
| 2013/0227008 A1* | 8/2013 | Yang | G06F 1/12 |
| | | | 709/204 |
| 2013/0332529 A1* | 12/2013 | Orehawa | H04L 65/403 |
| | | | 709/204 |
| 2015/0092794 A1* | 4/2015 | Aweya | H04J 3/0667 |
| | | | 370/503 |
| 2015/0222413 A1* | 8/2015 | Pietilainen | G06F 1/14 |
| | | | 709/248 |
| 2015/0229587 A1 | 8/2015 | Ma et al. | |
| 2015/0318941 A1 | 11/2015 | Zheng et al. | |
| 2016/0182214 A1 | 6/2016 | Chen | |
| 2018/0145821 A1* | 5/2018 | Pietilainen | H04J 3/0641 |

FOREIGN PATENT DOCUMENTS

| | | |
|---|---|---|
| CN | 102263630 A | 11/2011 |
| CN | 102843205 A | 12/2012 |
| CN | 102868516 A | 1/2013 |
| CN | 103428086 A | 12/2013 |
| CN | 104426645 A | 3/2015 |
| EP | 0832524 A1 | 4/1998 |

OTHER PUBLICATIONS

"Timing Loop Detection/Avoiding by ESMC Extension and Link Ring Protection Protocols in SyncE Network," Research Disclosure, Kenneth Mason Publications, vol. 585, No. 12, Jan. 1, 2013, XP007141843, 10 pages.

IEEE Std 1588™-2008 (Revision of IEEE Std 1588-2002), "IEEE Standard for a Precision Clock Synchronization Protocol for Networked Measurement and Control Systems," IEEE Instrumentation and Measurement Society, IEEE New York, NY, USA, Jul. 24, 2008, 289 pages.

ITU-T, G.8262/Y.1362 (Jan. 2015), Series G: Transmission Systems and Media, Digital Systems and Networks, Packet over Transport aspects—Synchronization, quality and availability targets, Series Y: Global Information Infrastructure, Internet Protocol Aspects and Next—Generation Networks, Internet protocol aspects—Transport, Timing characteristics of synchronous Ethernet equipment slave clock, Telecommunication Standardization Sector of ITU, Jan. 2015, 38 pages.

ITU-T, G.811 (Sep. 1997), Series G: Transmission Systems and Media, Digital Systems and Networks, Digital transmission systems—Digital networks—Design objectives for digital networks, Timing characteristics of primary reference clocks, Telecommunication Standardization Sector of ITU, Sep. 1997, 11 pages.

ITU-T G.812, Series G: Transmission Systems and Media, Digital Systems and Networks, Digital networks—Design objectives for digital networks, Timing requirements of slave clocks suitable for use as node clocks in synchronization networks, Telecommunication Standardization Sector of ITU, Jun. 2004, 46 pages.

* cited by examiner

METHOD AND APPARATUS FOR TRANSMITTING CLOCK PACKET

CROSS-REFERENCE TO RELATED APPLICATIONS

This application is a continuation of International Application No. PCT/CN2016/071315, filed on Jan. 19, 2016, the disclosure of which is hereby incorporated by reference in its entirety.

TECHNICAL FIELD

The present application relates to the communications field, and in particular, to a method and an apparatus for transmitting a clock packet.

BACKGROUND

To meet a requirement for data transmission between devices, it is necessary to ensure by means of clock synchronization that clock errors from different devices are within an acceptable range. When clock synchronization is applied to a ring network, there is a given probability of clock loops, and therefore communication performance of the network deteriorates.

At present, in a ring network, a clock loop may be prevented by using a path tracking method. For example, a clock identity of a boundary clock (BC) device is added to every clock packet passing through the boundary clock device. The clock identity of the boundary clock device is an identity of a clock source used by the boundary clock device. If a clock packet passes through a first BC device and a second BC device, a clock identity of the first BC device and a clock identity of the second BC device are carried in the clock packet. If a third BC device receives the clock packet, the third BC device parses the clock packet. When a quantity of devices in the ring network is relatively large, a packet transmitted by using this method is relatively long, and a large quantity of resources need to be consumed for parsing the packet. This affects communication performance of the network.

SUMMARY

In view of this, embodiments of the present disclosure provide a method and an apparatus for transmitting a clock packet, so as to reduce resources consumed by packet parsing and improve communication performance of a network.

According to a first aspect, a method for transmitting a clock packet is provided, and the method includes:

generating, by a first network element, a first clock packet, where the first clock packet includes a first source identity and first clock information, and the first source identity is used to indicate a device that provides the first clock information;

sending, by the first network element, the first clock packet to a second network element, where the second network element is a device that forms a ring network with the first network element;

receiving, by the first network element, a second clock packet sent by the second network element, where the second clock packet includes a second source identity and second clock information, and the second source identity is used to indicate a device that provides the second clock information; and skipping tracking, by the first network element, the second clock information after determining that the second source identity is the same as the first source identity.

The method for transmitting a clock packet provided in this embodiment of the present disclosure may be applied to the ring network including the first network element and the second network element, and the first network element may track clock information of a grandmaster clock device directly.

In the method for transmitting a clock packet provided in this embodiment of the present disclosure, a first clock packet and a second clock packet do not need to carry identities of clock sources tracked by all passed network elements. For example, the first clock packet carries a first source identity, the first source identity is used to indicate a device that provides first clock information, and the first clock information is clock information used by the first network element. The second clock packet carries the second source identity, the second identity is used to indicate the device that provides second clock information, and the second clock information is clock information used by the second network element. If the second source identity is the same as the first source identity, a clock source of the second network element is the same as a clock source of the first network element, and the first network element does not need to track the clock source of the second network element. In this way, a clock loop can be prevented with no or only a small increase in a length of the clock packet. This reduces resources consumed by packet parsing and improves communication performance of a network.

Optionally, the device that provides the first clock information is a grandmaster clock device, and the generating, by a first network element, a first clock packet includes: using, by the first network element, clock information obtained from the grandmaster clock device as the first clock information; using, by the first network element, an identity of the grandmaster clock device as the first source identity; and generating, by the first network element, the first clock packet according to the first clock information and the first source identity.

Optionally, the device that provides the first clock information is the first network element, and the generating, by a first network element, a first clock packet includes: using, by the first network element, clock information obtained from a local clock source of the first network element as the first clock information; using, by the first network element, an identity of the first network element as the first source identity; and generating, by the first network element, the first clock packet according to the first clock information and the first source identity.

Optionally, the method further includes: using, by the first network element, the second clock information as to-be-tracked clock information after determining that the second source identity is different from the first source identity. In this way, the first network element may determine that the clock information tracked by the first network element is different from the clock information tracked by the second network element, and if the second clock information is from the grandmaster clock device, the first network element may use the second clock information as the to-be-tracked clock information.

Optionally, a packet header of the first clock packet includes a reserved field, and the reserved field is used to carry the first source identity. Increasing a length of the first clock packet is not required by using the reserved field included in the packet header of the first clock packet as an extension, so as to reduce resources consumed by packet parsing.

Optionally, the first clock packet further includes a type-length-value (TLV) field, and the TLV field may carry the first source identity. A length of the first clock packet may be increased slightly by extending the first clock packet, for example, adding the TLV field, so as to reduce resources consumed by packet parsing.

Optionally, the first clock packet may include an announce (Announce) packet.

According to a second aspect, an apparatus for transmitting a clock packet is provided, and the apparatus includes:

a generation module, configured to generate a first clock packet, where the first clock packet includes a first source identity and first clock information, and the first source identity is used to indicate a device that provides the first clock information;

a sending module, configured to send the first clock packet generated by the generation module to a second network element, where the second network element is a device that forms a ring network with the first network element;

a receiving module, configured to receive a second clock packet sent by the second network element, where the second clock packet includes a second source identity and second clock information, and the second source identity is used to indicate a device that provides the second clock information; and a first processing module, configured to skip tracking the second clock information after determining that the second source identity is the same as the first source identity.

The apparatus for transmitting a clock packet provided in this embodiment of the present disclosure may be a first network element. The first clock packet and the second clock packet do not need to carry identities of clock sources tracked by all passed network elements. For example, the first clock packet carries a first source identity, the first source identity is used to indicate a device that provides first clock information, and the first clock information is clock information used by the first network element. The second clock packet carries the second source identity, the second identity is used to indicate the device that provides second clock information, and the second clock information is clock information used by the second network element. If the second source identity is the same as the first source identity, a clock source of the second network element is the same as a clock source of the apparatus for transmitting a clock packet, and the apparatus for transmitting a clock packet does not need to track the clock source of the second network element. In this way, a clock loop can be prevented with no or only a small increase in a length of the clock packet. This helps to reduce resources consumed by packet parsing and improve communication performance of a network.

Optionally, the device that provides the first clock information is a grandmaster clock device, and the generation module is specifically configured to: use clock information obtained from the grandmaster clock device as the first clock information; use an identity of the grandmaster clock device as the first source identity; and generate the first clock packet according to the first clock information and the first source identity.

Optionally, the device that provides the first clock information is the first network element, and the generation module is specifically configured to: use clock information obtained from a local clock source of the first network element as the first clock information; use an identity of the first network element as the first source identity; and generate the first clock packet according to the first clock information and the first source identity.

Optionally, the apparatus further includes:

a second processing module, configured to use the second clock information as a to-be-tracked clock information after determining that the second source identity is different from the first source identity.

Optionally, a packet header of the first clock packet includes a reserved field, and the reserved field is used to carry the first source identity. Increasing a length of the first clock packet is not required by using the reserved field included in the packet header of the first clock packet as an extension, so as to reduce resources consumed by packet parsing.

Optionally, the first clock packet further includes a type-length-value (TLV) field, and the TLV field may carry the first source identity. A length of the first clock packet may be increased slightly by extending the first clock packet, for example, adding the TLV field, so as to reduce resources consumed by packet parsing.

Optionally, the first clock packet may include an Announce packet.

According to a third aspect, a device for transmitting a clock packet is provided, and the device includes: a processor, a memory, a communications bus, and a transceiver. The processor, the memory, and the transceiver are connected by using the communications bus. The transceiver may be a communications interface. The memory is configured to store instructions. The processor may control the transceiver to receive or send a signal. The processor reads instructions stored in the memory to perform the method provided in the first aspect or any of the possible implementation manners of the first aspect.

According to the method, apparatus, and device for transmitting a clock packet provided in the embodiments of the present disclosure, a first clock packet and a second clock packet do not need to carry identities of clock sources tracked by all passed network elements. For example, the first clock packet carries a first source identity, the first source identity is used to indicate a device that provides first clock information, and the first clock information is clock information used by the first network element. The second clock packet carries the second source identity, the second identity is used to indicate the device that provides second clock information, and the second clock information is clock information used by the second network element. If the second source identity is the same as the first source identity, a clock source of the second network element is the same as a clock source of the apparatus for transmitting a clock packet, and the apparatus for transmitting a clock packet does not need to track the clock source of the second network element. In this way, a clock loop can be prevented with no or only a small increase in a length of the clock packet. This helps to reduce resources consumed by packet parsing and improve communication performance of a network.

BRIEF DESCRIPTION OF DRAWINGS

To describe the technical solutions in embodiments of the present disclosure more clearly, the following briefly describes the accompanying drawings required and used for the embodiments of the present disclosure. Apparently, the accompanying drawings in the following description show merely some embodiments of the present disclosure, and a person skilled in the art may still derive other drawings from these accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure.

Figure 1:
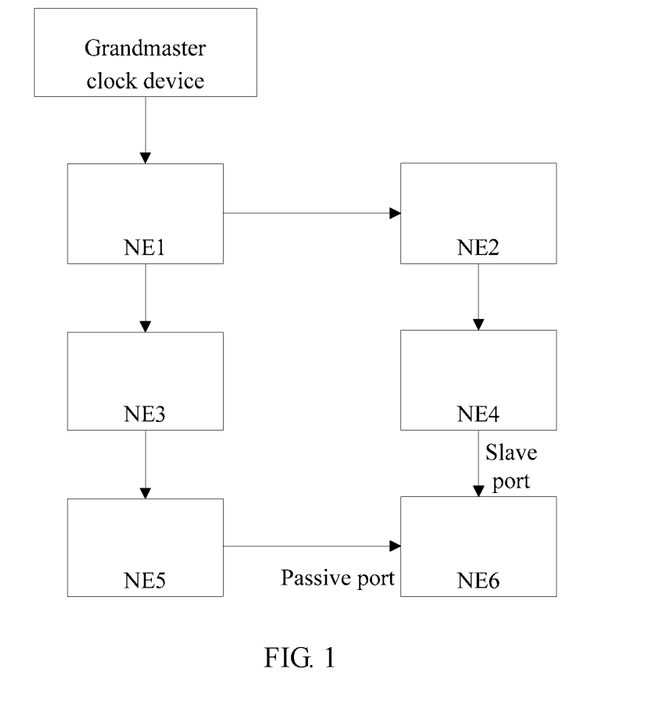
FIG. 1 is a schematic diagram of a network scenario.

FIG. 1 is a schematic diagram of a network scenario. The network shown in FIG. 1 includes: six network elements (NE) and one grandmaster clock device. A quantity of NEs and a quantity of grandmaster clock devices are not limited to the quantities shown in FIG. 1. For example, the network may include at least two grandmaster clock devices and at least two NEs, and the at least two NEs may form one ring network.

A port of the NE may be set to any one of three modes. The three modes include: a master port mode, a slave port mode, and a passive port mode. A port set to the master port mode may be used to send a clock packet. A port set to the slave port mode may be used to receive a clock packet. A port set to the passive port mode may be used to receive a clock packet. Any one NE has only one port set to the slave port mode. Any one NE may have N ports set to the passive port mode, and may have M ports set to the master port mode. N is an integer greater than or equal to zero; and M is an integer greater than or equal to zero.

The NE is provided with a local clock source, and the NE may periodically send a clock packet. The clock packet includes clock information and a clock source identity, and the clock source identity is used to indicate a clock source that provides the clock information for the NE. As shown in FIG. 1, if the grandmaster clock device and an NE1 are in a connected state, the NE1 is synchronized with the grandmaster clock device. The clock packet sent by the NE1 includes an identity of the grandmaster clock device (grandmaster Identity). For example, the grandmaster identity may be carried in a grandmaster clock source identity field of the clock packet sent by the NE1. If the grandmaster clock device is not connected to the NE1 or the grandmaster clock device and the NE1 are in a disconnected state, the NE1 cannot be synchronized with the grandmaster clock device. The NE1 uses a local clock source of the NE1 as a clock source for synchronization. The clock packet sent by the NE1 includes a clock identity of the local clock device. For example, the clock identity may be carried in a grandmaster clock source identity field of the clock packet.

The clock packet sent by the NE1 may be forwarded in two directions: NE1-NE3-NE5-NE6 and NE1-NE2-NE4-NE6. If a passive port of an NE6 receives a clock packet sent from the NE1 earlier than a slave port of the NE6, in other words, if a passive port of the NE6 receives a clock source identity included in the clock packet earlier than a slave port of the NE6, the passive port of the NE6 becomes a master port of the NE6. The NE6 sends the clock source identity to an NE5, and the clock source identity is forwarded along the direction of NE6-NE5-NE3-NE1. If a slave port of the NE6 receives a clock packet sent from the NE1 earlier than a passive port of the NE6, in other words, if a slave port of the NE6 receives the clock source identity included in the clock packet earlier than a passive port of the NE6, the slave port of the NE6 becomes a master port of the NE6, and the passive port of the NE6 becomes a slave port of the NE6. The NE6 sends the clock source identity to an NE4, and the clock source identity is forwarded along the direction of NE6-NE4-NE2-NE1.

After the NE1 is disconnected from the grandmaster clock device, there is no grandmaster clock source available in the ring network. However, the clock packet sent by the NE1 for the last time before the NE1 is disconnected from the grandmaster clock device includes the identity of the grandmaster clock device, and the NEs in the ring network use a clock source corresponding to the identity of the grandmaster clock device as an available clock source, and forward the identity of the grandmaster clock device. This results in a clock loop.

This embodiment of the present disclosure provides a method and an apparatus for transmitting a clock packet, so as to realize that a clock loop is prevented with no or only a small increase in a length of the clock packet, and reduce resources consumed by packet parsing and improves communication performance of a network. The technical solutions of the embodiments of the present disclosure may be applied to communications system such as a Global System of Mobile communications (GSM) system, a Code Division Multiple Access (CDMA) system, a Wideband Code Division Multiple Access (WCDMA) system, a General Packet Radio Service (GPRS) system, a Long Term Evolution (LTE) system, a Universal Mobile Telecommunication System (UMTS), and a Worldwide Interoperability for Microwave Access (WiMAX) communications system. The technical solutions of the embodiments of the present disclosure may also be applied to a system with packet-based clock synchronization, for example, a system using the Institute of Electrical and Electronics Engineers (IEEE) 1588V2 standard for clock synchronization.

Figure 2:
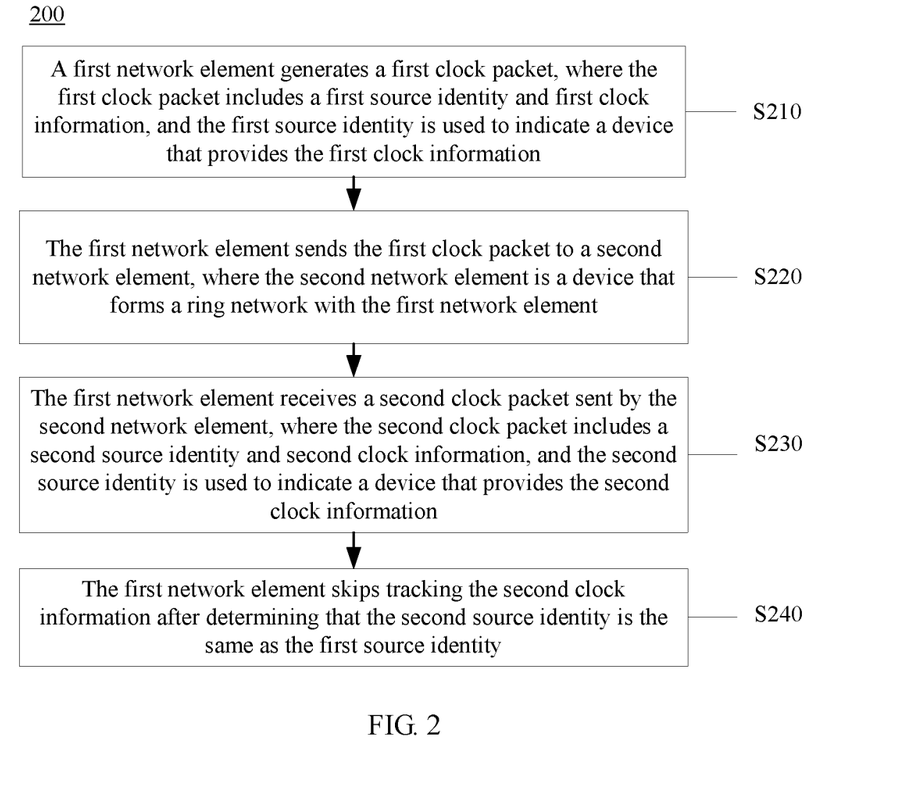
FIG. 2 is a flowchart of a method for transmitting a clock packet according to an embodiment of the present disclosure.

FIG. 2 shows a schematic flowchart of a method 200 for transmitting a clock packet according to an embodiment of the present disclosure, and the method 200 may be executed by a first network element. The first network element is a device that can directly receive grandmaster clock information sent by a grandmaster clock device. As shown in FIG. 2, the method 200 includes the following steps:

S210. The first network element generates a first clock packet, where the first clock packet includes a first source identity and first clock information, and the first source identity is used to indicate a device that provides the first clock information.

S220. The first network element sends the first clock packet to a second network element, where the second network element is a device that forms a ring network with the first network element.

S230. The first network element receives a second clock packet sent by the second network element, where the second clock packet includes a second source identity and second clock information, and the second source identity is used to indicate a device that provides the second clock information.

S240. The first network element skips tracking the second clock information after determining that the second source identity is the same as the first source identity.

For example, in a ring network using the IEEE 1588V2 standard for clock synchronization, a first network element adds a first source identity to a generated first clock packet, for example, adding the first source identity to a reserved field of a packet header of the clock packet, so as to indicate that clock information in the first clock packet is provided by the first network element. A field carrying the first source identity in the first clock packet can carry only the information added by the first network element and another network element cannot use this field to carry information. The generated first clock packet is sent to a second network element connected to a master port of the first network element.

When receiving a second clock packet sent from another network element, for example, the second network element, in the ring network, the first network element checks whether a second source identity in the second clock packet is the same as the first source identity. If the second source identity is the same as the first source identity, second clock information in the second clock packet is from the first network element. The second clock information in the second clock packet has a large error after several hops of forwarding, and cannot be used as synchronization clock information of the ring network. The first network element may discard the second clock packet. If the second source identity is different from the first source identity, the second clock information in the second clock packet is not from the first network element. The second clock information may be from another network element connected to a grandmaster clock device, and the first network element may not discard the second clock packet. The first network element may use the second clock information in the second clock packet as to-be-tracked clock information. Optionally, the first network element may determine whether the second clock information is best master clock information according to a best master clock (BMC) algorithm, thereby determining whether to discard the second clock packet.

It should be understood that this embodiment of the present disclosure is described by using only a ring network using the IEEE 1588V2 standard for clock synchronization as an example. However, the present disclosure is not limited thereto and the method for transmitting a clock packet according to this embodiment of the present disclosure may also be applied to other ring networks or systems.

For example, the device that provides the first clock information may be the grandmaster clock device, and that the first network element generates a first clock packet includes: the first network element uses clock information obtained from the grandmaster clock device as the first clock information; the first network element uses an identity of the grandmaster clock device as the first source identity; and the first network element generates the first clock packet according to the first clock information and the first source identity.

In this embodiment of the present disclosure, when the first network element and the grandmaster clock device are in a connected state, the grandmaster clock information sent by the grandmaster clock device and received by the first network element is the best clock information, and the grandmaster clock information is added to the first clock packet.

For example, the device that provides the first clock information is the first network element, and that the first network element generates a first clock packet includes: the first network element uses clock information obtained from a local clock source of the first network element as the first clock information; the first network element uses an identity of the first network element as the first source identity; and the first network element generates the first clock packet according to the first clock information and the first source identity.

In this embodiment of the present disclosure, when the first network element and the grandmaster clock device are in a disconnected state, or when the first network element is not directly connected to the grandmaster clock device, the first network element has no other available clock source and adds the clock information obtained from the local clock source to the first clock packet.

Optionally, after S230, the method provided by this embodiment of the present disclosure further includes: using, by the first network element, the second clock information as to-be-tracked clock information after determining that the second source identity is different from the first source identity.

Optionally, the first source identity may be carried in a reserved position of a packet header of the first clock packet.

TABLE 1

| General packet header | | | | | | | | Octets | Offset |
|---|---|---|---|---|---|---|---|---|---|
| Bits (Bits) | | | | | | | | | |
| 7 | 6 | 5 | 4 | 3 | 2 | 1 | 0 | (Octets) | (Offset) |
| transportSpecific (transportSpecific) | | | | packetType (packetType) | | | | 1 | 0 |
| Reserved (Reserved) 1 | | | | versionPTP (versionPTP) | | | | 1 | 1 |
| packetLength (packetLength) | | | | | | | | 2 | 2 |
| domainNumber (domainNumber) | | | | | | | | 1 | 4 |
| Reserved (Reserved) 2 | | | | | | | | 1 | 5 |
| flagField (flagField) | | | | | | | | 2 | 6 |
| correctionField (correctionField) | | | | | | | | 8 | 8 |
| Reserved (Reserved) 3 | | | | | | | | 4 | 16 |
| sourcePortIdentity (sourcePortIdentity) | | | | | | | | 10 | 20 |
| sequenceId (sequenceId) | | | | | | | | 2 | 30 |
| controlField (controlField) | | | | | | | | 1 | 32 |
| logPacketInterval (logPacketInterval) | | | | | | | | 1 | 33 |

The packet header of the clock packet is shown in Table 1. Any one of three reserved fields in the packet header can be used to carry the first source identity. For example, one bit, such as "1", of the Reserved 1 may be used as the first source identity. The first source identity is used to indicate that the clock information in the first clock packet is provided by the first network element. Alternatively, two bits may be used to indicate that the clock information in the first clock packet is obtained from the grandmaster clock device or obtained from the local clock source. For example, "10" may be used to indicate that the clock information in the first clock packet is obtained from the grandmaster clock device. "11" may be used to indicate that the clock information in the first clock packet is obtained from the local clock source.

It should be understood that the foregoing embodiment is only an example, and the present disclosure is not limited thereto. Any indication method that can be used to indicate that the clock information in the first clock packet is from the first network element shall fall within the protection scope of the present disclosure. For example, the local clock source identity or the grandmaster clock source identity of the first network element may alternatively be added as the first source identity to a reserved field.

It should be further understood that this embodiment of the present disclosure is described by using only an example in which one external grandmaster clock device is connected to a ring network, and the present disclosure is not limited thereto. The method for transmitting a clock packet according to this embodiment of the present disclosure may also be applied to ring networks or other systems to which a plurality of external grandmaster clock devices is connected. For example, when one grandmaster clock device is connected to the NE1, another grandmaster clock device is connected to the NE2, the one grandmaster clock device is different from the another grandmaster clock device, a source identity of the one grandmaster clock device obtained by the NE1 is "10", and a source identity of the another grandmaster clock device obtained by the NE2 is "01". If information carried in a source identity field in a clock packet received by the NE1 is "10", the NE1 may discard the received clock packet. If information carried in a source identity field in a clock packet received by the NE1 is "01", the NE1 may not discard the received clock packet. Similarly, if information carried in a source identity field in a clock packet received by the NE2 is "10", the NE2 may not discard the received clock packet. If information carried in a source identity field in a clock packet received by the NE2 is "01", the NE2 may discard the received clock packet.

Optionally, the first clock packet further includes a TLV field, and the TLV field may carry the first source identity. A length of the first clock packet may be increased slightly by extending the first clock packet, for example, adding the TLV field, so as to reduce resources consumed by packet parsing.

It should be understood that the foregoing embodiment is only an example, and the present disclosure is not limited thereto. For example, a transmit-side port identity of the first network element may be added to the first clock packet in a suffix form after being encoded in a TLV format.

Optionally, the first clock packet includes an announce packet. It should be understood that this embodiment of the present disclosure is described by using only the announce packet as an example, and the present disclosure is not limited thereto. The first clock packet may alternatively be another packet that is used to carry both a source identity field and a grandmaster clock source identity field.

In the method for transmitting a clock packet provided in this embodiment of the present disclosure, a first clock packet and a second clock packet do not need to carry identities of clock sources tracked by all passed network elements. For example, the first clock packet carries a first source identity, the first source identity is used to indicate a device that provides first clock information, and the first clock information is clock information used by the first network element. The second clock packet carries the second source identity, the second identity is used to indicate the device that provides second clock information, and the second clock information is clock information used by the second network element. If the second source identity is the same as the first source identity, a clock source of the second network element is the same as a clock source of the first network element, and the first network element does not need to track the clock source of the second network element. In this way, a clock loop can be prevented with no or only a small increase in a length of the clock packet. This helps to reduce resources consumed by packet parsing and improve communication performance of a network.

Optionally, the second clock packet sent by the second network element may be different from the first clock packet sent by the first network element. The second network element may generate the second clock packet by using the following two ways. For example, the device that provides the second clock information may be the grandmaster clock device, and that the second network element generates a second clock packet includes: the second network element uses clock information obtained from the grandmaster clock device as the second clock information; the second network element uses an identity of the grandmaster clock device as the second source identity; and the second network element generates the second clock packet according to the second clock information and the second source identity. Alternatively, the device that provides the second clock information is the second network element, and that the second network element generates a second clock packet includes: the second network element uses clock information obtained from a local clock source of the second network element as the second clock information; the second network element uses an identity of the second network element as the first source identity; and the second network element generates the second clock packet according to the second clock information and the second source identity.

Optionally, the second clock packet sent by the second network element may be the first clock packet generated by the first network element.

Figure 3:
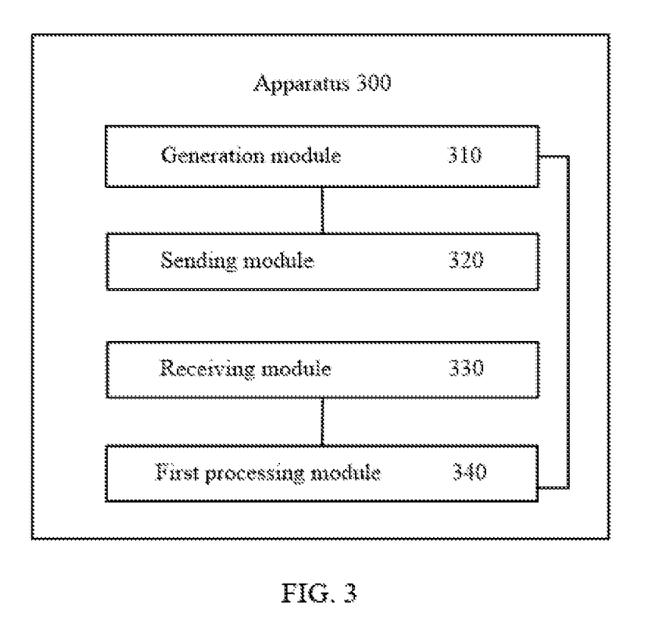
FIG. 3 is a schematic diagram of an apparatus for transmitting a clock packet according to an embodiment of the present disclosure.

With reference to FIG. 2, the foregoing describes in detail the method for transmitting a clock packet according to this embodiment of the present disclosure. With reference to FIG. 3, the following describes in detail an apparatus for transmitting a clock packet according to an embodiment of the present disclosure.

As shown in FIG. 3, an apparatus 300 for transmitting a clock packet according to this embodiment of the present disclosure includes:

a generation module 310, configured to generate a first clock packet, where the first clock packet includes a first source identity and first clock information, and the first source identity is used to indicate a device that provides the first clock information;

a sending module 320, configured to send the first clock packet generated by the generation module to a second network element, where the second network element is a device that forms a ring network with the first network element;

a receiving module 330, configured to receive a second clock packet sent by the second network element, where the second clock packet includes a second source identity and second clock information, and the second source identity is used to indicate a device that provides the second clock information; and a first processing module 340, configured to skip tracking the second clock information after determining that the second source identity is the same as the first source identity.

The apparatus for transmitting a clock packet provided in this embodiment of the present disclosure may be a first network element. The first clock packet and the second clock packet do not need to carry identities of clock sources tracked by all passed network elements. For example, the first clock packet carries a first source identity, the first source identity is used to indicate a device that provides first clock information, and the first clock information is clock information used by the first network element. The second clock packet carries the second source identity, the second identity is used to indicate the device that provides second clock information, and the second clock information is clock information used by the second network element. If the second source identity is the same as the first source identity, a clock source of the second network element is the same as a clock source of the apparatus for transmitting a clock packet, and the apparatus for transmitting a clock packet does not need to track the clock source of the second network element. In this way, a clock loop can be prevented with no or only a small increase in a length of the clock packet. This helps to reduce resources consumed by packet parsing and improve communication performance of a network.

Optionally, the device that provides the first clock information is a grandmaster clock device, and the generation module 310 is specifically configured to: use clock information obtained from the grandmaster clock device as the first clock information; use an identity of the grandmaster clock device as the first source identity; and generate the first clock packet according to the first clock information and the first source identity.

Optionally, the device that provides the first clock information is the first network element, and the generation module 310 is specifically configured to: use clock information obtained from a local clock source of the first network element as the first clock information; use an identity of the first network element as the first source identity; and generate the first clock packet according to the first clock information and the first source identity.

Optionally, the apparatus 300 further includes:

a second processing module 350, configured to use the second clock information as to-be-tracked clock information after determining that the second source identity is different from the first source identity.

Optionally, a packet header of the first clock packet generated by the generation module 310 includes a reserved field, and the reserved field is used to carry the first source identity.

Optionally, the first source identity generated by the generation module 310 may be an identity carried in a TLV. For example, the first clock packet may further include a TLV field, and the TLV field may carry the first source identity.

Optionally, the first clock packet generated by the generation module 310 includes an announce packet.

It should be understood that the apparatus 300 for transmitting a clock packet according to this embodiment of the present disclosure may correspond to an apparatus in the method 200 for transmitting a clock packet in the embodiments of the present disclosure, and the foregoing and other operations and/or functions of the modules in the apparatus 300 are used to implement corresponding processes of the steps in the method 200 respectively. For conciseness, repeated descriptions are omitted properly.

Figure 4:
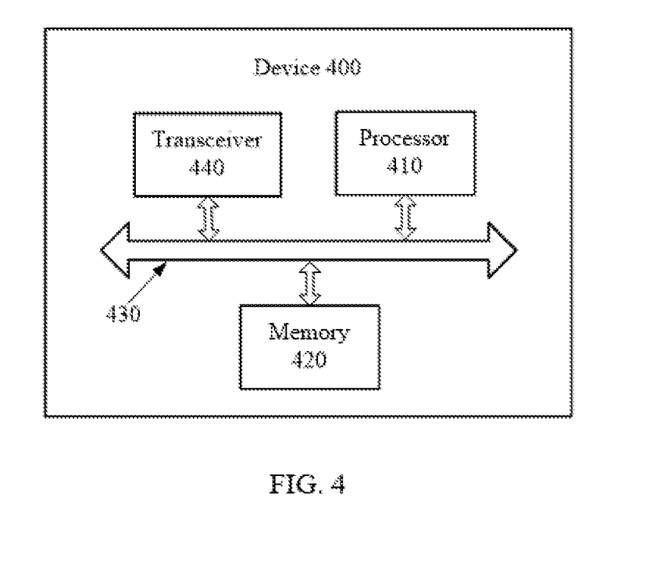
FIG. 4 is a schematic diagram of a device for transmitting a clock packet according to an embodiment of the present disclosure.

As shown in FIG. 4, an embodiment of the present disclosure further provides a device 400 for transmitting a clock packet. The apparatus 400 includes: a processor 410, a memory 420, a communications bus 430, and a transceiver 440. The processor 410, the memory 420, and the transceiver 440 are connected by using the communications bus 430. The memory 420 is configured to store instructions. The processor 410 is configured to execute the instructions stored in the memory 420 to control the transceiver 440 to receive or send signals.

The processor 410 is configured to generate a first clock packet, where the first clock packet includes a first source identity and first clock information, and the first source identity is used to indicate a device that provides the first clock information. The transceiver 440 is configured to send the first clock packet generated by the processor 410 to a second network element, and receive a second clock packet sent by the second network element, where the second clock packet includes a second source identity and second clock information, and the second source identity is used to indicate a device that provides the second clock information. The processor 410 is further configured to skip tracking the second clock information after determining that the second source identity is the same as the first source identity. The second network element is a device that forms a ring network with the device 400.

Therefore, the device 400 for transmitting a clock packet according to this embodiment of the present disclosure adds a first source identifier indicating a source of clock information to a generated clock packet and determines whether to discard a received clock packet according to whether a source identity in the received clock source packet is the same as the first source identity. In this way, a clock loop can be prevented with no or only a small increase in a length of the clock packet, and communication performance of a network is improved.

It should be understood that in this embodiment of the present disclosure, the processor 410 may be a CPU, or the processor 410 may be another general purpose processor, a digital signal processor (DSP), an application-specific integrated circuit (ASIC) a field programmable gate array (FPGA) or another programmable logic device, a discrete gate or transistor logic device, a discrete hardware component, or the like. The general purpose processor may be a microprocessor, or the processor may be any conventional processor or the like.

The memory 420 may include a read-only memory and a random access memory, and provides an instruction and data to the processor 410. Apart of the memory 420 may further include a non-volatile random access memory. For example, the memory 420 may further store device-type information.

In addition to a data bus, the communications bus 430 may further include a power bus, a control bus, a state signal bus, and the like. However, for clarity of description, various buses are marked uniformly as the communications bus 430 in the figure.

In an implementation process, the steps of the foregoing method may be completed by using a hardware integrated logic circuit in the processor 410 or by using a software instruction. The steps of the method disclosed with reference to the embodiments of the present disclosure may be executed and completed by a hardware processor, or may be executed and completed by using a combination of hardware and software modules in a processor. The software module may be located in a storage medium mature in the art such as a random access memory, a flash memory, a read-only memory, a programmable read-only memory, an electrically erasable programmable memory, or a register. The storage medium is located in the memory 420, the processor 410 reads information from the memory 420, and the steps of the foregoing method are completed in combination with hardware of the processor 410. To avoid repetition, details are not further described herein.

Optionally, in an embodiment, the device that provides the first clock information is a grandmaster clock device, and the processor 410 is specifically configured to: use clock information obtained from the grandmaster clock device as the first clock information; use an identity of the grandmaster clock device as the first source identity; and generate the first clock packet according to the first clock information and the first source identity.

Optionally, in an embodiment, the device that provides the first clock information is a local clock source of the device 400, and the processor 410 is specifically configured to: use clock information obtained from the local clock source as the first clock information; use an identity of the device 400 as the first source identity; and generate the first clock packet according to the first clock information and the first source identity.

Optionally, in an embodiment, the processor 410 is specifically configured to: use the second clock information as to-be-tracked clock information after determining that the second source identity is different from the first source identity.

Therefore, the device for transmitting a clock packet according to this embodiment of the present disclosure adds a first source identifier indicating a source of clock information to a generated clock packet and determines whether to discard a received clock packet by checking whether a source identity in the received clock packet is the same as the first source identity. In this way, a clock loop can be prevented with no or only a small increase in a length of the clock packet, and communication performance of a network is improved.

Optionally, in an embodiment, a packet header of the first clock packet generated by the processor 410 includes a reserved field, and the reserved field is used to carry the first source identity.

It should be understood that the device 400 for transmitting a clock packet according to this embodiment of the present disclosure may correspond to a device in the method 200 for transmitting a clock packet in an embodiment of the present disclosure, and the foregoing and other operations and/or functions of the respective modules in the device 400 are used to implement respective processes of the steps in the method 200 respectively. For ease of conciseness, repeated descriptions are omitted properly.

The device for transmitting a clock packet provided in this embodiment of the present disclosure may be a first network element. The first clock packet and the second clock packet do not need to carry identities of clock sources tracked by all passed network elements. For example, the first clock packet carries a first source identity, the first source identity is used to indicate a device that provides first clock information, and the first clock information is clock information used by the first network element. The second clock packet carries the second source identity, the second identity is used to indicate the device that provides second clock information, and the second clock information is clock information used by the second network element. If the second source identity is the same as the first source identity, a clock source of the second network element is the same as a clock source of the apparatus for transmitting a clock packet, and the apparatus for transmitting a clock packet does not need to track the clock source of the second network element. In this way, a clock loop can be prevented with no or only a small increase in a length of the clock packet. This helps to reduce resources consumed by packet parsing and improve communication performance of a network.

A person of ordinary skill in the art may be aware that the units and algorithm steps in the examples described with reference to the embodiments disclosed in this specification may be implemented by electronic hardware, computer software, or a combination thereof. To clearly describe the interchangeability between hardware and software, the compositions and steps of the examples have been generally described in foregoing descriptions based on functions. Whether the functions are executed by hardware or software depends on particular applications and design constraints of the technical solutions. A person skilled in the art may use a different method to implement the described functions for each particular application, but it should not be considered that such implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected according to actual needs to achieve the objectives of the solutions of the embodiments of the present disclosure.

In addition, the functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for transmitting a clock packet, the method comprising:

generating, by a first network element, a first clock packet comprising a first source identity and first clock information, the first source identity for indicating a device that provides the first clock information;

sending, by the first network element, the first clock packet to a second network element forming a ring network with the first network element;

receiving, by the first network element, a second clock packet sent by the second network element, wherein the second clock packet comprises a second source identity and second clock information, the second source identity for indicating a device that provides the second clock information; and skipping tracking, by the first network element, the second clock information after determining that the second source identity is the same as the first source identity.

2. The method according to claim 1, wherein the device that provides the first clock information is a grandmaster clock device, and wherein generating, by the first network element, the first clock packet comprises:

using, by the first network element, clock information obtained from the grandmaster clock device as the first clock information, using, by the first network element, an identity of the grandmaster clock device as the first source identity, and generating, by the first network element, the first clock packet according to the first clock information and the first source identity.

3. The method according to claim 1, wherein the device that provides the first clock information is the first network element, and wherein generating, by the first network element, the first clock packet comprises:

using, by the first network element, clock information obtained from a local clock source of the first network element as the first clock information, using, by the first network element, an identity of the first network element as the first source identity, and generating, by the first network element, the first clock packet according to the first clock information and the first source identity.

4. The method according to claim 1, further comprising:

using, by the first network element, the second clock information as to-be-tracked clock information after determining that the second source identity is different from the first source identity.

5. The method according to claim 1, wherein a packet header of the first clock packet comprises a reserved field for carrying the first source identity.

6. An apparatus for transmitting a clock packet, wherein the apparatus is a first network element, the apparatus comprising:

a processor; and memory coupled to the processor and for storing programming instructions which, when executed by the processor, cause the apparatus to:

generate a first clock packet comprising a first source identity and first clock information, the first source identity for indicating a device that provides the first clock information, send the first clock packet to a second network element forming a ring network with the first network element, receive a second clock packet sent by the second network element, wherein the second clock packet comprises a second source identity and second clock information, the second source identity for indicating a device that provides the second clock information, and skip tracking the second clock information after determining that the second source identity is the same as the first source identity.

7. The apparatus according to claim 6, wherein the device that provides the first clock information is a grandmaster clock device, and wherein the programming instructions, when executed by the processor, cause the apparatus to:

use clock information obtained from the grandmaster clock device as the first clock information, an identity of the grandmaster clock device as the first source identity, and generate the first clock packet according to the first clock information and the first source identity.

8. The apparatus according to claim 6, wherein the device that provides the first clock information is the first network element, and wherein the programming instructions, when executed by the processor, cause the apparatus to:

use clock information obtained from a local clock source of the first network element as the first clock information, use an identity of the first network element as the first source identity, and generate the first clock packet according to the first clock information and the first source identity.

9. The apparatus according to claim 6, wherein the programming instructions, when executed by the processor, cause the apparatus to:

use the second clock information as to-be-tracked clock information after determining that the second source identity is different from the first source identity.

10. The apparatus according to claim 6, wherein a packet header of the first clock packet comprises a reserved field for carrying the first source identity.

11. A computer program product comprising a non-transitory computer-readable medium of a first network element, the non-transitory computer-readable medium stores computer executable instructions which, when executed by a processor, cause the first network element to:

generate a first clock packet comprising a first source identity and first clock information, the first source identity for indicating a device that provides the first clock information;

send the first clock packet to a second network element forming a ring network with the first network element;

receive a second clock packet sent by the second network element, wherein the second clock packet comprises a second source identity and second clock information, the second source identity for indicating a device that provides the second clock information; and skip tracking the second clock information after determining that the second source identity is the same as the first source identity.

12. The computer program product according to claim 11, wherein the device that provides the first clock information is a grandmaster clock device, and wherein the computer executable instructions, when executed by the processor, cause the first network element to:

use clock information obtained from the grandmaster clock device as the first clock information, use an identity of the grandmaster clock device as the first source identity, and generate the first clock packet according to the first clock information and the first source identity.

13. The computer program product according to claim 11, wherein the device that provides the first clock information is the first network element, and wherein the computer executable instructions, when executed by the processor, cause the first network element to:

use clock information obtained from a local clock source of the first network element as the first clock information, use an identity of the first network element as the first source identity, and generate the first clock packet according to the first clock information and the first source identity.

14. The computer program product according to claim 11, wherein the computer executable instructions, when executed by the processor, further cause the first network element to:

use the second clock information as to-be-tracked clock information after determining that the second source identity is different from the first source identity.

15. The computer program product according to claim 11, wherein a packet header of the first clock packet comprises a reserved field for carrying the first source identity.

16. A system for transmitting a clock packet, the system comprising:

a first network element comprising:

a processor, and memory coupled to the processor and for storing programming instructions which, when executed by the processor, cause the first network element to:

generate a first clock packet comprising a first source identity and first clock information, the first source identity for indicating a device that provides the first clock information;

send the first clock packet to a second network element forming a ring network with the first network element;

receive a second clock packet sent by the second network element, wherein the second clock packet comprises a second source identity and second clock information, the second source identity for indicating a device that provides the second clock information; and skip tracking the second clock information after determining that the second source identity is the same as the first source identity.

17. The system according to claim 16, wherein the device that provides the first clock information is a grandmaster clock device, and the programming instructions, when executed by the processor, cause the first network element to:

use clock information obtained from the grandmaster clock device as the first clock information, use an identity of the grandmaster clock device as the first source identity, and generate the first clock packet according to the first clock information and the first source identity.

18. The system according to claim 16, wherein the device that provides the first clock information is the first network element, and wherein the programming instructions, when executed by the processor, cause the first network element to:

use clock information obtained from a local clock source of the first network element as the first clock information, use an identity of the first network element as the first source identity, and generate the first clock packet according to the first clock information and the first source identity.

19. The system according to claim 16, wherein the programming instructions, when executed by the processor, further cause the first network element to:

use the second clock information as to-be-tracked clock information after determining that the second source identity is different from the first source identity.

20. The system according to claim 16, wherein a packet header of the first clock packet comprises a reserved field for carrying the first source identity.

* * * * *